United States Patent
Muir et al.

(10) Patent No.: US 6,767,979 B1
(45) Date of Patent: Jul. 27, 2004

(54) CROSSLINKED POLYMERS AND REFRACTIVE DEVICES FORMED THEREFROM

(75) Inventors: Andrew Victor Graham Muir, Surrey (GB); Lee Rowan, Warwickshire (GB); Stephen Alister Jones, Surrey (GB); John Charles Stedman, Surrey (GB)

(73) Assignee: Biocompatibles UK Limited, Farnham (GB)

( * ) Notice: Subject to any disclaimer, the term of this patent is extended or adjusted under 35 U.S.C. 154(b) by 0 days.

(21) Appl. No.: 09/857,845

(22) PCT Filed: Dec. 13, 1999

(86) PCT No.: PCT/GB99/04206

§ 371 (c)(1),
(2), (4) Date: Sep. 20, 2001

(87) PCT Pub. No.: WO00/35980

PCT Pub. Date: Jun. 22, 2000

(30) Foreign Application Priority Data

Dec. 11, 1998 (EP) .............................. 98310163

(51) Int. Cl.$^7$ .............................. C08F 122/40
(52) U.S. Cl. ........................ 526/262; 526/278; 526/287; 526/288; 526/292.1; 526/292.2; 526/292.3; 526/292.5; 526/292.6; 526/292.95; 526/293; 526/311; 526/312
(58) Field of Search ..................... 526/262, 278, 526/287, 288, 292.1, 292.2, 292.3, 292.5, 292.6, 292.95, 293, 311, 312

(56) References Cited

U.S. PATENT DOCUMENTS

| | | | | | |
|---|---|---|---|---|---|
| 4,573,998 A | * | 3/1986 | Mazzocco | ...................... | 623/6 |
| 4,608,049 A | * | 8/1986 | Kelman | ......................... | 623/6 |
| 4,664,666 A | * | 5/1987 | Barrett | ........................ | 623/6 |
| 4,702,244 A | * | 10/1987 | Mazzocco | ............... | 128/303 R |
| 5,270,415 A | * | 12/1993 | Sulc et al. | .................. | 526/265 |
| 5,290,892 A | * | 3/1994 | Namdaran | ................. | 526/259 |
| 5,391,669 A | * | 2/1995 | Sulc et al. | .................. | 525/265 |
| 5,502,139 A | * | 3/1996 | Toh | ............................ | 526/284 |
| 6,416,550 B2 | * | 7/2002 | Freeman | .................... | 623/6.11 |

FOREIGN PATENT DOCUMENTS

| | | | |
|---|---|---|---|
| EP | 0 308 130 B1 | * | 3/1989 |
| EP | 0 485 197 A1 | * | 5/1992 |
| WO | 92/07885 | * | 5/1992 |
| WO | 92/11301 | * | 7/1992 |

* cited by examiner

Primary Examiner—Bernard Lipman
(74) Attorney, Agent, or Firm—Sughrue Mion, PLLC

(57) ABSTRACT

A polymer is formed of ethylenically unsaturated monomers including a zwitterionic monomer, an aromatic monomer and a cross-linking monomer. Preferably the crosslinking monomer includes at least one a group containing compound and at least one aliphatic group containing compound. The polymer is water-swellable and a hydrogen has optical and mechanical properties rendering it suitable for use as an intraocular refractive device such as an intraocular lens.

41 Claims, No Drawings

CROSSLINKED POLYMERS AND REFRACTIVE DEVICES FORMED THEREFROM

BACKGROUND OF THE INVENTION

The present invention relates to a polymeric composition, which is a crosslinked water swellable polymer, the hydrogel of which is transparent and has a high refractive index, rendering it useful for use in a refractive device, for instance an intraocular lens.

RELEVANT PRIOR ART

Various products have been developed for replacing or augmenting the natural lens. Replacement lenses may be used where the original lens is clouded by cataracts. Lenses which augment the natural lens and which are intended to be inserted into the eye, include intraocular contact lenses, corneal implants, corneal inlays and corneal onlays.

A method of implanting an intraocular lens in a rolled up form, to minimise the size of the incision is in widespread use. Such a device is described in U.S. Pat. Nos. 4,573,998 and 4,702,244. In these specifications, the material of the lens is described as having a shape memory. The device thus recovers its original conformation after being released from the restraining insertion device through which it is introduced. The above specifications do not describe in any detail the materials used to form the lens.

In U.S. Pat. No. 4,608,049, a foldable intraocular lens is formed of a silicone rubber or a crosslinked hydroxyethylmethacrylate:N-vinyl-2-pyrrolidone:methacrylic acid polymer, that is a water-swellable material.

Further descriptions of hydrogel intraocular lenses are by Barrett in U.S. Pat. No. 4,664,666. Barrett uses a hydrogel of hydroxyethylmethacrylate, a common component of hydrogel contact lens compositions. One problem with poly HEMA hydrogels is that the refractive index of the gel is relatively low. It is preferred for a hydrogel to have higher refractive indices, for instance at least 1.45, up to around 1.60.

Higher refractive index materials are described in EP-A0485197. The polymers must be formed of at least two aryl acrylate polymers, for instance 2-phenylethyl acrylate and 2-phenylethyl methacrylate. The crosslinker is selected from aliphatic diacrylates. The refractive indices of the material is in the range 1.553 to 1.556. The polymers are not, however, hydrogels (that is they are not water-swellable).

EP-A-0308130 describes elastic intraocular lenses formed of copolymers of methacrylate and acrylate esters which are respectively relatively hard and relatively soft at body temperature. The monomers are all aliphatic acrylates. The crosslinker is an aliphatic dimethacrylate.

In our earlier application WO-A-9207885, we describe crosslinked polymers formed of zwitterionic monomer and nonionic copolymerisable monomer, and hydrogel lenses formed therefrom. The examples all used an alkyl acrylate or hydroxyalkylacrylate comonomer. The crosslinking monomers were all aliphatic di-ethylenically unsaturated compounds.

In EP-A-0563299 a copolymer of a zwitterionic monomer and a nonionic monomer is used as a contact lens. In the worked examples, comonomers are hydroxyethylmethacrylate, N-vinylpyrollidone and methylmethacrylate. Crosslinkers are all aliphatic compounds (allyl methacrylate and diethylene glycol di-methacrylate).

In U.S. Pat. Nos. 5,391,669 and 5,270,415, hydrogels formed of balanced charge ion pairs and nonionic comonomer are used as contact lenses. The balanced charge ion pair may be a zwitterionic monomer. In the worked examples, the nonionic comonomers are selected from hydroxyethyl methacrylate, silyl group containing monomers, alkyl methacrylates, hydroxypropyl methacrylate, fluoroalkyl methacrylate and hydroxypropyl methacrylamide. Crosslinkers used in the worked examples are all aliphatic compounds.

SUMMARY OF THE INVENTION

A new crosslinked polymer according to the invention is obtainable by radical polymerisation of ethylenically unsaturated monomers including a) a zwitterionic monomer of the general formula I $$YBX \qquad \qquad I$$

wherein

B is a straight or branched alkylene, oxaalkylene or oligo-oxaalkylene chain optionally containing one or more fluorine atoms up to and including perfluorinated chains or, if X or Y contains a terminal carbon atom bonded to B, a valence bond;

X is a zwitterionic group; and

Y is an ethylenically unsaturated polymerisable group selected from

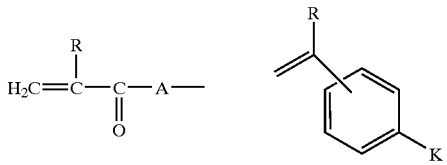

$CH_2=C(R)-CH_2-O-$, $CH_2=C(R)-CH_2OC(O)-$, $CH_2=C(R)OC(O)-$, $CH_2=C(R)-O-$, $CH_2=C(R)CH_2OC(O)N(R^1)-$, $R^2OOCCR=CRC(O)-O-$, $RCH=CHC(O)O-$, $RCH=C(COOR^2)CH_2-C(O)-O-$,

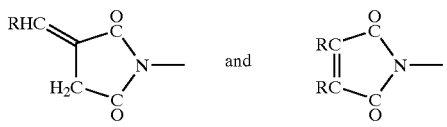

wherein:

R is hydrogen or a $C_1$–$C_4$ alkyl group;

$R^1$ is hydrogen or a $C_1$–$C_4$ alkyl group or $R^1$ is —B—X where B and X are as defined above; and $R^2$ is hydrogen or a $C_{1-4}$alkyl group or BX where B and X are as defined above;

A is —O— or —$NR^1$—;

K is a group —$(CH_2)_pOC(O)-$, —$(CH_2)_pC(O)O-$, —$(CH_2)_pOC(O)O-$, —$(CH_2)_pNR^3-$, —$(CH_2)_pNR^3C(O)-$, —$(CH_2)_pC(O)NR^3-$, —$(CH_2)_pNR^3C(O)O-$, —$(CH_2)_pOC(O)NR^3-$, —$(CH_2)_pNR^3C(O)NR^3-$ (in which the groups $R^3$ are the same or different), —$(CH_2)_pO-$, —$(CH_2)_pSO_3-$, or, optionally in combination with B, a valence bond and p is from 1 to 12 and $R^3$ is hydrogen or a $C_1$–$C_4$ alkyl group.

b) an aromatic group containing monomer of the general formula II $$Y^1R^4 \qquad \qquad \text{II}$$

wherein $Y^1$ is selected from

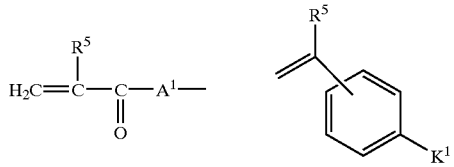

$CH_2=C(R^5)-CH_2-O-$, $CH_2=C(R^5)-CH_2OC(O)-$, $CH_2=C(R^5)OC(O)-$, $CH_2=C(R^5)-O-$, $CH_2=C(R^5)CH_2OC(O)N(R^6)-$, $R^7OOCCR^5=CR^5C(O)-O-$, $R^5CH=CHC(O)O-$, $R^5CH=C(COOR^7)CH_2-C(O)-O-$,

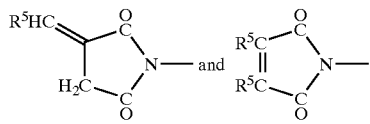

wherein:
$R^5$ is hydrogen or a $C_1$–$C_4$ alkyl group,
$R^6$ is hydrogen or a $C_1$–$C_4$ alkyl group or $R^5$ is $R^3$;
$R^7$ is hydrogen or a $C_{1-4}$ alkyl group or $R^3$;
$A^1$ is —O— or —$NR^5$—; and
$K^1$ is a group —$(CH_2)_qOC(O)$—, —$(CH_2)_qC(O)O$—, —$(CH_2)_qOC(O)O$—, —$(CH_2)_qNR^8$—, —$(CH_2)_qNR^8C(O)$—, —$(CH_2)_qC(O)NR^8$—, —$(CH_2)_qNR^8C(O)O$—, —$(CH_2)_qOC(O)NR^8$—, —$(CH_2)_qNR^8C(O)NR^8$— (in which the groups $R^8$ are the same or different), —$(CH_2)_qO$—, —$(CH_2)_qSO_3$—, or a valence bond and p is from 1 to 12 and $R^8$ is hydrogen or a $C_1$–$C_4$ alkyl group;

and $R^4$ is an aromatic group; and c) a cross-linking monomer of the general formula III $$(Y^2)_nR^9 \qquad \qquad \text{III}$$

in which n is an integer of at least 2, each $Y^2$ is selected from

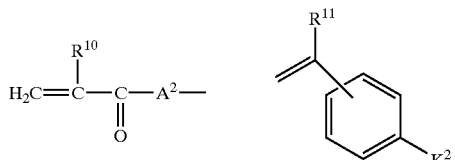

$CH_2=C(R^{10})-CH_2-O-$, $CH_2=C(R^{10})-CH_2OC(O)-$, $CH_2=C(R^{10})OC(O)-$, $CH_2=C(R^{10})-O-$, $CH_2=C(R^{10})CH_2OC(O)N(R^{11})-$, $R^{12}OOCCR^{10}=CR^{10}C(O)-O-$, $R^{10}CH=CHC(O)O-$, $R^{10}CH=C(COOR^{12})CH_2-C(O)-O-$,

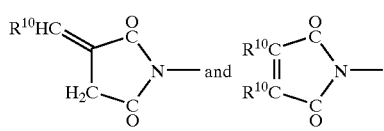

wherein:

$R^{10}$ is hydrogen or a $C_1$–$C_4$ alkyl group;
$R^{11}$ is hydrogen or a $C_1$–$C_4$ alkyl group or $R^{11}$ is $R^3$;
$R^{12}$ is hydrogen or a $C_{1-4}$ alkyl group or $R^3$;
$A^2$ is —O— or —$NR^{11}$—;
$K^2$ is a group —$(CH_2)_rOC(O)$—, —$(CH_2)_rC(O)O$—, —$(CH_2)_rOC(O)O$—, —$(CH_2)_rNR^{12}$—, —$(CH_2)_rNR^{13}C(O)$—, —$(CH_2)_rC(O)NR^{13}$—, —$(CH_2)_rNR^{13}C(O)O$—, —$(CH_2)_rOC(O)NR^{13}$—, —$(CH_2)_rNR^{13}C(O)NR^{13}$— (in which the groups $R^{13}$ are the same or different), —$(CH_2)_rO$—, —$(CH_2)_rSO_3$— or a valence bond and r is from 1 to 12 and $R^{13}$ is hydrogen or a $C_1$–$C_4$ alkyl group;

and $R^9$ is an n-functional organic group.

Suitable examples of aromatic groups $R^4$ are optionally substituted aralkyl and alkaryl groups. Most preferably, a group $R^4$ is an unsubstituted aryl or aralkyl group, in which the alkyl group has 1 to 4 carbon atoms, for instance benzyl, 2-phenylethyl or phenyl.

For optimum copolymerisability, the groups Y, $Y^1$ and $Y^2$ have the same general definition. Most preferably each such group is an (alk)acrylic or a styrenic group. An acrylic group, $H_2C=C(H$ or $Me)CO-(O$ or $NH)$ are particularly preferred. Preferably all such groups are either methacrylic $R=R^5=R^{10}=Me)$ or acrylic (R, $R^5$, $R^{10}$=hydrogen), and are preferably all ester or amide derivatives thereof. Most conveniently, the monomers are all acrylic esters, generally either methacrylate esters or acrylate esters.

In the invention, it is found that optimum crosslinking of the aromatic and zwitterionic monomers is achieved where a crosslinking monomer of the formula III in which the group $R^9$ is an aromatic group is included. Suitable aromatic groups are, for instance, phenylene, alkarylene, aralkylene, and bisphenol A-type groups. Most preferably the crosslinker includes bisphenol A dimethacrylate. The crosslinker may be di-, tri-, tetra- or higher functional, for instance an oligomeric or polymeric compound.

It is found to be particularly preferred for the crosslinking monomer to include a monomer of the general formula III in which the group $R^9$ is an aliphatic group. Suitable aliphatic groups $R^9$ are $C_{2-8}$-alkylene, $C_{2-4}$-alkyleneoxy-$C_{2-4}$-alkylene or oligo($C_{2-4}$-alkyleneoxy)-$C_{2-4}$-alkylene (e.g. —$(CH_2CH_2O)_tCH_2CH_2$—, where t is 1–50).

Most preferably a mixture of crosslinking agents is included, including at least one crosslinking agent in which $R^9$ is an aromatic group and at least one crosslinking agent in which $R^9$ is an aliphatic group.

In the general formula I, the zwitterionic group preferably has the general formula IV

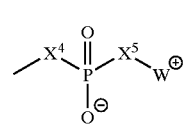

in which the moieties $X^4$ and $X^5$, which are the same or different, are —O—, —S—, —NH— or a valence bond, preferably —O—, and $W^+$ is a group comprising an ammonium, phosphonium or sulphonium cationic group and a group linking the anionic and cationic moieties which is preferably a $C_{2-12}$ alkylene group, preferably in which $W^+$ is a group of formula —$W^1$—$N^+R^{14}_3$, —$W^1$—$P^+R^{15}_3$, $W^1$—$S^+R^{15}_2$ or —$W^1$-Het$^+$ in which:

$W^1$ is alkylene of 1 or more, preferably 2–6 carbon atoms optionally containing one or more ethylenically unsaturated double or triple bonds, disubstituted-aryl, alkylene aryl, aryl alkylene, or alkylene aryl alkylene, disubstituted cycloalkyl, alkylene cycloalkyl, cycloalkyl alkylene or alkylene cycloalkyl alkylene, which group $W^1$ optionally contains one or more fluorine substituents and/or one or more functional groups; and either the groups $R^{14}$ are the same or different and each is hydrogen or alkyl of 1 to 4 carbon atoms, preferably methyl, or aryl, such as phenyl or two of the groups $R^{14}$ together with the nitrogen atom to which they are attached form a heterocyclic ring containing from 5 to 7 atoms or the three groups $R^{14}$ together with the nitrogen atom to which they are attached form a fused ring structure containing from 5 to 7 atoms in each ring, and optionally one or more of the groups $R^{14}$ is substituted by a hydrophilic functional group, and the groups $R^{15}$ are the same or different and each is $R^{14}$ or a group $OR^{14}$, where $R^{14}$ is as defined above; or Het is an aromatic nitrogen-, phosphorus- or sulphur-, preferably nitrogen-, containing ring, for example pyridine.

Most preferably, the zwitterionic group of the formula IV, has the general formula V:

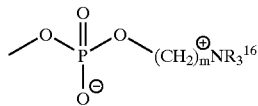

V where the groups $R^{16}$ are the same or different and each is hydrogen or $C_{1-4}$ alkyl, and m is from 1 to 4, in which preferably the groups $R^{16}$ are the same.

Alternatively, the zwitterionic group may be a betaine group (ie in which the cation is closer to the backbone), for instance a sulpho-, carboxy- or phospho-betaine. A betaine group should have no overall charge and is preferably therefore a carboxy- or sulpho-betaine. If it is a phospho-betaine the phosphate terminal group must be a diester, i.e., be esterified with an alcohol. Such groups may be represented by the general formula VI

VI in which $X^2$ is a valence bond, —O—, —S— or —NH—, preferably —O—;

V is a carboxylate, sulphonate or phosphate diester (monovalently charged) anion;

$R^{17}$ is a valence bond (together with $X^2$) or alkylene —C(O)alkylene- or —C(O)NHalkylene preferably alkylene and preferably containing from 1 to 6 carbon atoms in the alkylene chain;

the groups $R^{18}$ are the same or different and each is hydrogen or alkyl of 1 to 4 carbon atoms or the groups $R^{18}$ together with the nitrogen to which they are attached form a heterocyclic ring of 5 to 7 atoms; and $R^{19}$ is alkylene of 1 to 20, preferably 1 to 10, more preferably 1 to 6 carbon atoms.

One preferred sulphobetaine monomer has the formula VII

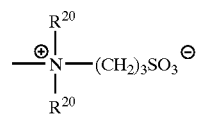

VII where the groups $R^{20}$ are the same or different and each is hydrogen or $C_{1-4}$ alkyl and s is from 2 to 4.

Preferably the groups $R^{20}$ are the same. It is also preferable that at least one of the groups $R^{20}$ is methyl, and more preferable that the groups $R^{20}$ are both methyl.

Preferably s is 2 or 3, more preferably 3.

Alternatively the zwitterionic group may be an amino acid moiety in which the alpha carbon atom (to which an amine group and the carboxylic acid group are attached) is joined through a linker group to the backbone of polymer A. Such groups may be represented by the general formula VIII

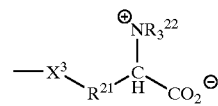

VIII in which $X^3$ is a valence bond, —O—, —S— or —NH—, preferably —O—, $R^{21}$ is a valence bond (optionally together with $X^3$) or alkylene, —C(O)alkylene- or —C(O)NHalkylene, preferably alkylene and preferably containing from 1 to 6 carbon atoms; and the groups $R^{22}$ are the same or different and each is hydrogen or alkyl of 1 to 4 carbon atoms, preferably methyl, or two of the groups $R^{19}$, together with the nitrogen to which they are attached, form a heterocyclic ring of from 5 to 7 atoms, or the three group $R^{22}$ together with the nitrogen atom to which they are attached form a fused ring structure containing from 5 to 7 atoms in each ring.

The mole ratio of zwitterionic monomer to aromatic group containing monomer is generally in the range 1:99 to 99:1, preferably 1:20 to 1:1, more preferably in the range 1:10 to 1:2. The amount of zwitterionic monomer in total monomer is preferably in the range 1 to 95%, more preferably 5 to 50%, most preferably 10 to 25%. The amount of aromatic group containing monomer is preferably in the range 10 to 99%, more preferably 50 to 95%, most preferably 75 to 90%.

In the polymerisation mixture, the crosslinking monomer is generally present in a molar amount in the range 0.01% to 10%, most preferably in the range 0.1 to 5% based on total moles of monomer. Where a mixture of aromatic group containing cross-linking monomer to aliphatic group containing monomer is used the molar ratio of the two is preferably in the range 10:1 to 1:10, preferably 5:1 to 1:5, more preferably 2:1 to 1:2 most preferably 3:2 to 2:3.

The zwitterionic group containing monomer is generally included in sufficient levels to render the polymer swellable in water and to render the hydrogel more biocompatible.

According to a further aspect of the invention, there is provided a hydrogel formed of the novel crosslinked polymer and, dispersed throughout the polymer, an aqueous liquid. The water content of the polymer when fully swollen in deionised water is preferably in the range 10 to 50%, for instance in the range 20 to 40%, most preferably in the range 25 to 35%.

Preferably the hydrogel (the polymer swollen in water) is transparent. It is found that the hydrogel of the invention has a high transmission rate for visible light. The average transmission rate should preferably be above 90% throughout the range of visible light, 400 to 700 nm wavelengths.

The incorporation of the aromatic monomer enables high refractive indices to be achieved. Thus the refractive index of the fully water swollen hydrogel, may be at least 1.45, for instance up to 1.60. Preferably the refractive index is in the range 1.45 to 1.55.

The present invention includes also a polymerisation process, in which the mixture of monomers a, b and c are subjected to conditions whereby polymerisation is initiated and propagated. Initiation may be by any suitable means, for instance using thermal, redox or UV initiators, optionally in combination with one another. The polymer of the invention, when used as an intraocular lens, may include an absorber of ultraviolet light.

Since the zwitterionic monomer tends to be very polar and aromatic monomers tend to be non polar, the monomers may be immiscible with one another. In order to achieve a homogenous polymerisation mixture therefore it may be necessary to include a non polymerisable diluent liquid which acts as a common solvent for the monomers. A suitable solvent is an alcohol. The solvent is generally removed from the product polymer after polymerisation, for instance by evaporation or by solvent replacement using an alternative liquid, generally water or other aqueous solution.

It is generally necessary to include any non polymerisable liquid diluent in an amount in the range 5 to 90% by weight based on the total weight of the polymerisation mixture. In order to avoid unnecessary solvent removal, the level is preferably less than 75%, for instance less than 50%. It is generally necessary to include at least 10% to achieve adequate dissolution of the monomers.

The polymerisation is generally conducted in some form of mould, for instance to form precursor products from which shaped lenses may be formed. Where such products are for instance rods, buttons or other lens precursors, shaping to form appropriate three dimensional shapes is generally by lathing. In order for lathing to take place, it is generally necessary to remove any polymerization diluent prior to carrying out the lathing step.

Alternatively the lens or other final product may be polymerised in a mould of the desired final shape. In this case, the solvent is removed after polymerisation, for instance by solvent replacement.

For any polymerisation method, a final step in the formation of a hydrogel product involves swelling the crosslinked polymer in an aqueous liquid. The materials, when swollen in water have very desirable mechanical properties, for instance enabling them to be used as foldable IOL's. The strain at break for the swollen materials may be at least 50%, or even more than 100%. The modulus should preferably be in the range 1 to 4 MPa.

The materials (xerogels) have hardness values high enough to render them suitable for shaping by machining, for instance, by lathe cutting.

The product is found to have very desirable mechanical, optical and biocompatible properties rendering it suitable for use as a refractive device. The polymers are of particular value for use as intraocular devices especially intraocular lenses (IOL's) such as replacement lenses, lenses to augment the natural lens, e.g. posteria chamber phakic IOL's, anterior chamber phakic IOL's, corneal implants such as corneal inlays, corneal onlays and intracorneal rings.

The improved biocompatibility resulting from the incorporation of a zwitterionic monomer is believed to result in less damage being caused by a phakic lens on the natural lens (avoiding cataract formation) or on the iris by chafing. For any intraocular device the improved biocompatibility should result in reduced inflammatory response. The results presented hereinafter show that the materials cause less endothelial damage than prior art materials.

The following examples illustrate the invention.

Abbreviations
EWC=Equilibrium Water Contact
RI=Refractive Index
Trans=Optical transmission
BA=Benzyl acrylate
HEMA-PC=2-Methacryloyloxyethyl-2'-trimethylammonium ethyl phosphate inner salt
LM=Lauryl Methacrylate
EGDMA=Ethylene glycol dimethacrylate
BADMA=Bisphenol-A dimethacrylate
FEM=Fluoroethyl Methacrylate
AIBN=Azoisobutyronitrile General Polymerisation Method The monomers, including the crosslinking monomer, in the desired quantities, were dissolved in dry ethanol, in an amount of 20% (based on total polymerization mixture weight) unless otherwise specified. Initiator of the desired type and in the desired amount was dissolved into the mixture (AIBN, unless otherwise specified). The liquid polymerization mixture was thoroughly degassed using nitrogen. The polymerisation mixture was then injected into the desired mould (to form a membrane or button, as the case may be) which bad previously been flushed with nitrogen. The mould was subsequently sealed and suspended in a water bath (containing oxygen scavenger) at the desired temperature (usually 60° C.) for the desired period (usually sixteen hours) to complete polymerisation. Unless otherwise specified, the polymer, still in the mould after removal from the water bath, was annealed under vacuum at 90° C. for a further sixteen hours, before being removed from the moulds. For all button polymerisations, the buttons, after removal from the mould, were annealed at 110° C. under vacuum for 4 days.

Mechanical Properties

EWC

The EWC is measured by weighing hydrogel lenses in their fully hydrated state and after drying in an oven overnight at 110° C.

Refractive Index

The retractive index is measured on an Atago device with the material in fully swollen (in water) form.

Hardness

The hardness of the F-type button (from which a lens is cut) is measured using a Type D Shore Durometer. A cross section is cut from the button using a microslicer or lathe and the centre and edge hardness recorded. This test is carried out on the xerogel.

Expansion Factor

This is determined from the ratio of diameter of lens hydrated to diameter of lens dry.

Tensile Properties

The mechanical analysis is carried out as a tensile test using a Mini Instron 44, using a 5 load cell at a speed of 5 mm per minute. The material is tested at 25+/−2° C. and kept hydrated throughout the test.

Biological Properties

The following tests are carried out on disks cut from polymer membranes, unless otherwise specified.

Fibrinogen Adhesion

This assay quantifies protein deposited on a test surface using polycolonal anti serum and enzyme-conjugated secondary anti serum. It provides a useful assessment of haemocompatibility and general biocompatibility.

Buttons of test material are each placed into a well of a twenty four well plate.

One microgram fibrinogen in 50 µl PBS. The fibrinogen solution is left in contact with the samples for two hours at room temperature. Subsequently the samples are washed three times with PBS, excess binding sites are blocked by overnight incubation with 4% bovine serum albumin in PBS at 4° C. The buttons are subsequently washed three times with PBS and replaced into fresh wells of a new 24 well plate. 500 µl diluted antithuman fibrinogen antiserum (1:5000 in PBS) is added and incubated with the samples for 30 minutes at room temperature. The buttons are washed three times in PBS and placed into fresh wells of a 24 well plate. 500 µl diluted horseradish peroxidase-conjugated rabbit anti-goat antiserum (1:500 in PBS) is added and incubated for 30 minutes at room temperature. The buttons are washed three times in PBS and placed into fresh wells of a further 24 well plate. A substrate for the peroxidase enzyme is subsequently added in an appropriate buffer after contact with the samples for 10 minutes at room temperature. A terminator is added and the solutions read in a suitable colour remitter. The results are reported in terms of relative light units as compared to PMMA and pHEMA controls. High values thus correspond to high levels of adhesion.

Bacterial Adhesion Assay

This assay measures the bacterial (*Staphylococcus epidermidis*) attachment on the test materials using extraction of cellular ATP of attached bacterial cells. Extracted ATP is evaluated using bioluminescent technique. If bacteria adhere to and are carried with an intraocular lens into the eye, they could cause an infection.

Samples of the material under test are placed in the desired number of wells in a microtitre plate. A bacterial suspension at $3 \times 10^8$ CFU per ml in phosphate buffered saline is incubated in the wells for four hours at 37° C. under agitation. The bacterial suspension is aspirated from the wells and samples subsequently rinsed in sterile phosphate buffered saline before being placed into the wells of a new plate. Lysis buffer (0.1% trichloroacetic acid, 1% xylenol 2 mM EDTA in deionised water) is placed into the well and left in contact with the sample for 10 minutes to extract the ATP. Extracted ATP is diluted with tris acetate buffer 1:1, ATP monitoring reagent is added and light emission determined in a bioluminescent plate reader. Bioluminessence is related to a number of bacterial cells by generating a calibration curve.

Fibroblast Adhesion Assay

This assay determines the adhesion of a standard adherent cell line, mouse 3T3 fibreblasts, in tissue culture medium, to samples on the test.

The fibroblast cells are cultivated in a tissue culture step to confluent or near confluent monolayer. The monolayer is detached from the flask using a solution of trypsin-EDTA, and subsequently suspended in serum-containing medium. Test disks of the material under test of 13 mm diameter are placed into twenty four well plates. 0.5 mls of cell suspension (having a cell concentration of 3000 per ml) is added and incubated for 72 hours at 37° C. The samples are removed from the wells and washed with PBS. The samples with adherent cells are placed into wells of a new plate and subjected to lysis for 30 minutes at room temperature followed by freezing overnight. After addition of further lysis buffer, ATP monitoring reagent is added to the wells and luminescence subsequently read to determine ATP levels. The results are reported in terms of relative light units as compared to standard materials (polymethylmethacrylate and polyhydroxyethylmethacrylate).

Granulocyte Activation

This method measures granulocyte activation in response to superoxide radicals by disks of materials under test. It is a useful measure of biocompatibility. The cells subjected to the test are polymorphonuclear leucocytes (PMN's) from venus blood. Incubation of the cells in the presence of the materials under test is conducted in the presence of nitroblue tetrazolium, which detects the oxidative burst triggered by inflammatory materials upon granulocyte activation to be visualised colorimetrically.

PMN's are separated from venus blood using a suitable technique. They are suspended in Earl's salt solution containing 10% foetal calf serum at a cell density of $1 \times 10^6$ cells per ml. 100 µl of the cell suspension is contacted with 13 mm disks of samples under test in the wells of a microtitre plate. After 30 minutes at 37° C., the samples in the wells are washed three times with phosphate buffered saline and then 100 µl of nitroblue tetrazolium is added to the wells. Adherent cells are incubated with the NBT solution for at least one hour at 37° C. Subsequently cells are fixed using formaldehyde, washed and viewed under light microscopy. Activated granulocytes appear blue. The number of activated granulocytes as compared to polymethylmethacrylate controls and positive controls (polymethylmethacrylate treated with phorbol ester as a positive control).

Macrophage Adhesion

This protocol measures macrophage adhesion to test surfaces, another useful measure of biocompatibility. The protocol involves incubation with novel materials overnight which exploits the known tendency of macrophages to attach to plastics surfaces.

Suitable purification steps are conducted to separate out mononuclear cells from venus blood. The cells are suspended in serum-free macrophage medium (commercially available) at a concentration of $10^6$ cells per ml. 200 µl of medium is added to wells of a microtitre plate containing 13 mm diameter disks of materials under test. The plates are left overnight at 37° C. after which disks are moved to a new plate and washed three times before fixing with formaldehyde and staining with Dako anti-macrophage antibody-biotin conjugate. Attached antibody is subsequently visualised using a Sigma high intensity rapid stain kit containing an avidin-peroxidase conjugate with 3-amino-9-ethyl carbazole (AEC) as chromogen. The numbers of macrophages is determined using light microscopy and compared against controls.

Rabbit Epithelial Lens Cell Adhesion

AGO4677, a mortal primary rabbit lens epithelial cell strain was obtained from the National Institute of Aging (NIA) repository (Cambden, N.J., USA). The cells were cultures in Minimal Essential Eagles Medium (MEM) with double the normal concentration of non-essential amino acids (Gibco) and 10% (v/v) foetal calf serum (FCS) at a density of 6000 cells $cm^{-2}$ at 37° C. in 5% $CO_2$. The cells were never permitted to become confluent under maintenance conditions and were passaged by routine trypsin dispersion. Adhesion of the AGO4677 was assayed by ATP extraction 72 h after 1000 viable rabbit lens cells were plated onto discs of material. ATP was liberated by incubating each disk with 100 µl of a sterile hypotonic lysis buffer (0.01M Tris-Acetate pH 8, 2 mM EDTA). The ATP solution was then diluted 1:1 with a commercial assay buffer designed for ATP luminometry (0.1 M Tris-Acetate pH 8, 2 mM EDTA) and the amount of ATP in each sample measured using a commercial kit (BioOrbit-Wallac, Turku Finland) and a 96 well plate luminometer (Amerlite, Amersham).

Corneal Endothelial Cell Touch Test

This test method is a highly discriminating assay for intraocular lens utility. The test involves contacting materials under test with a confluent monolayer of bovine corneal endothelium (BCE) cells for a predetermined period of time and qualitatively assessing the damage to the monolayer.

Confluent monolayers of BCE cells in sterile tissue culture dishes are established by culturing in the presence of dulbecco's modified eagles medium (DMEM) containing foetal bovine serum, new born calf serum, penicillin and streptomycin. The monolayers were rinsed to remove unattached cells. A sterile 13 mm disk of test sample (xerogel) is rinsed ten times with sterile PBS to hydrate. The hydrated disk is then placed on the BCE monolayer surface and a weight placed upon the top of a disk to ensure contact (in the "Av Damage", and HamaIP tests (see Table 7) a 2 g weight was used, whilst a lighter weight was used for the "cell damage" results). After a predetermined period of time (3½ minutes) the disk is removed, fresh medium is added and the cells incubated for 15 minutes to allow recovery. The cells are then viewed under inverted light microscope and the damage is qualitatively assessed on a numerical scale of 0 (complete destruction) to 10 (minimal damage). Values are given as Av(erage) Damage in results. The cells are also analysed by fixing, staining with Harris hematoxylin solution and viewed using Argus 50 software and a Hamamatsu image processor (Hama IP). The results of the quantitative determination are expressed in terms of mean percent damage (sample number six).

EXAMPLE 1

Polymerisations were conducted to form membranes using the general polymerisation method between two glass plates lined with PET and separated by a PTFE spacer using azoisobutyronitrile and 20 weight % ethanol. The effect of including diluent monomer, lauryl methacrylate or fluoroethylmethacrylate, was investigated in these experiments. The monomers, and their proportions are shown in Table 1, as are the results of performing test methods for RI, EWC and visible light transmission at 700 nm and 480 nm on polymer fully swollen in water.

TABLE 1

| Example | Mole % | | | | | | Properties | | | |
| --- | --- | --- | --- | --- | --- | --- | --- | --- | --- | --- |
| | BA | HEMA-PC | LM | FEM | BADMA | EGDMA | RI | 700 nm | 450 nm | EWC |
| 1.1.1 | 83 | 15 | 0 | 0 | 1 | 1 | 1.4555 | 94.5 | 89.26 | 37.6 |
| 1.1.2 | 83 | 15 | 0 | 0 | 0.75 | 1.25 | 1.4585 | 94.79 | 89.9 | 37.7 |
| 1.1.3 | 83 | 15 | 0 | 0 | 0.5 | 1.5 | 1.451 | 94.87 | 89.58 | 39.6 |
| 1.1.4 | 79 | 15 | 0 | 0 | 1 | 5 | 1.4805 | 95.66 | 93.69 | 29.9 |
| 1.2.1 | 78 | 15 | 0 | 5 | 1 | 1 | 1.4565 | — | — | 38.2 |
| 1.2.2 | 73 | 15 | 0 | 10 | 1 | 1 | 1.452 | — | — | 38.1 |
| 1.2.3 | 63 | 15 | 0 | 20 | 1 | 1 | 1.447 | — | — | 37.3 |
| 1.2.4 | 53 | 15 | 0 | 30 | 1 | 1 | 1.4405 | — | — | 38.1 |
| 1.3.1 | 83 | 15 | 0 | 0 | 1 | 1 | 1.462 | 89.15 | 82.54 | 37.9 |
| 1.3.2 | 78 | 15 | 5 | 0 | 1 | 1 | 1.459 | 87.46 | 81.31 | 35.7 |
| 1.3.3 | 73 | 15 | 10 | 0 | 1 | 1 | 1.454 | 86.31 | 77.2 | 36.3 |
| 1.3.4 | 63 | 15 | 20 | 0 | 1 | 1 | 1.4505 | 90.18 | 82.99 | 35.0 |
| 1.3.5 | 53 | 15 | 30 | 0 | 1 | 1 | 1.446 | 93.31 | 88 | 31.8 |
| 1.3.6 | 43 | 15 | 40 | 0 | 1 | 1 | 1.483 | 94.31 | 88.01 | 29.7 |
| 1.4.1 | 73.5 | 15 | 10 | 0 | 1 | 0.5 | 1.454 | 88.2 | 81.38 | 37.0 |
| 1.4.2 | 63.5 | 15 | 20 | 0 | 1 | 0.5 | 1.46 | 91.34 | 84.72 | 36.2 |
| 1.5.1 | 83.5 | 15 | 0 | 0 | 0.5 | 1 | 1.449 | 81.68 | 74.37 | 42.6 |
| 1.5.2 | 83 | 15 | 0 | 0 | 1 | 1 | 1.457 | 86.28 | 81.85 | 38.4 |
| 1.5.3 | 82 | 15 | 0 | 0 | 2 | 1 | 1.4715 | 76.84 | 72.11 | 33.2 |
| 1.5.4 | 84 | 15 | 0 | 0 | 1 | 0 | 1.465 | 93.87 | 91.48 | 35.8 |
| 1.5.5 | 83.5 | 15 | 0 | 0 | 1 | 0.5 | 1.4485 | 89.59 | 83.98 | 40.6 |
| 1.5.6 | 82 | 15 | 0 | 0 | 1 | 2 | — | 91.63 | 84.81 | 41.0 |
| 1.6.1 | 83 | 15 | 0 | 0 | 1 | 1 | 1.454 | 85.98 | 81.01 | 39.1 |
| 1.6.2 | 78 | 15 | 5 | 0 | 1 | 1 | 1.4535 | 87.31 | 81.41 | 39.2 |
| 1.6.3 | 73 | 15 | 10 | 0 | 1 | 1 | 1.454 | 85.73 | 78.63 | 38.2 |
| 1.6.4 | 78 | 15 | 0 | 5 | 1 | 1 | 1.4525 | 85.94 | 79.45 | 39.6 |
| 1.6.5 | 73 | 15 | 5 | 5 | 1 | 1 | 1.4525 | 86.82 | 79.85 | 38.3 |
| 1.7.1 | 83 | 15 | 0 | 0 | 1 | 1 | 1.456 | 96.55 | 93.76 | — |
| 1.7.2 | 73 | 15 | 10 | 0 | 1 | 1 | 1.459 | — | — | 33.7 |
| 1.7.3 | 85.5 | 12.5 | 0 | 0 | 1 | 1 | 1.469 | 95.82 | 92.58 | — |
| 1.7.4 | 75.5 | 12.5 | 10 | 0 | 1 | 1 | — | — | — | 30.4 |
| 1.7.5 | 88 | 10 | 0 | 0 | 1 | 1 | 1.488 | 95.84 | 92.75 | — |
| 1.7.6 | 78 | 10 | 10 | 0 | 1 | 1 | 1.485 | 93.32 | 88.57 | 23.7 |

The results show that high refractive index, optically clear materials can be formulated from monomers including HEMA-PC. These are expected to have improved biocompatibility compared to comparative materials not comprising pendant zwitterionic groups.

The results also show that, with the same weight proportion of HEMA-PC, replacing increasing levels of benzylmethacrylate with aliphatic diluent monomer results in a decrease in RI, with a similar level of charge resulting from such replacement by lauryl methacrylate or fluoroethyl methacrylate. Increasing the total level of crosslinker results in a decrease in the EWC with a corresponding increase in RI. The copolymers appear to have better transmission rates for visible light than the terpolymers. Reducing the level of HEMA-PC results in a reduction of EWC, and an increase in RI.

EXAMPLE 2

Further polymerisations to form membranes were conducted using the general method, to investigate the effect on the EWC, RI and transmission, and also the mechanical characteristics and biocompatibility, of changing the relative amounts of zwitterionic and aromatic group containing monomer. The biocompatibility is, in this experiment determined using the fibrinogen adsorption test described above, the control being a polymer of 98% mole benzyl methacrylate and 1% each (mole) of EGDMA and BADMA crosslinker. The monomer proportions are shown in Table 2. The results are shown in Table 3. The results show that the strain for materials formed from monomers including lauryl methacrylate in place of benzylacrylate is reduced. The results of example 2.1–2.5 show that polymers having PC groups can be formed with good mechanical and optical properties and which have good biocompatibility as adjudged by the reduction of fibrinogen adsorption.

TABLE 2

| Example | Mole % Monomers | | |
|---|---|---|---|
| | BA | HEMA-PC | LM |
| 2.1 | 83 | 15 | 0 |
| 2.2 | 85.5 | 12.5 | 0 |
| 2.3 | 88 | 10 | 0 |
| 2.4 | 90.5 | 7.5 | 0 |
| 2.5 | 83 | 15 | 0 |
| 2.6 | 73 | 15 | 10 |
| 2.7 | 63 | 15 | 20 |
| 2.8 | 53 | 15 | 30 |
| 2.9 | 43 | 15 | 40 |
| 2.10 | 33 | 15 | 50 |

TABLE 3

| Example | EWC | RI | Trans/ 700 nm % | Trans. 480 nm % | Modulus MPa | Tensile Strain % | Strength MPa | Fibr. gn. Redn. % |
|---|---|---|---|---|---|---|---|---|
| 2.1 | 38.3 | 1.450 | 92.25 | 87.31 | 1.312 | 81.8 | 0.740 | 73 |
| 2.2 | 32 | 1.461 | 93.18 | 87.36 | 1.773 | 67 | 0.758 | 79 |
| 2.3 | 27.6 | 1.480 | 93.22 | 87.96 | 1.870 | 116.7 | 1.399 | 83 |
| 2.4 | 26.8 | 1.488 | 93.12 | 88.04 | 2.109 | 142.5 | 1.932 | 76 |
| 2.5 | 38.8 | 1.459 | 91.43 | 86.11 | 0.814 | 63.8 | 0.560 | 74 |
| 2.6 | 35.1 | 1.460 | 90.87 | 85.93 | 0.914 | 56.7 | 0.600 | 72 |
| 2.7 | 32.4 | 1.461 | 91.03 | 85.99 | 1.064 | 45.1 | 0.549 | 77 |
| 2.8 | 32.2 | 1.451 | 90.45 | 86.14 | 1.043 | 42.2 | 0.544 | 67 |
| 2.9 | 29.0 | 1.452 | 90.63 | 86.05 | 1.063 | 40.2 | 0.499 | 77 |
| 2.10 | 27.5 | 1.454 | 90.73 | 85.87 | 0.984 | 45.1 | 0.573 | 74 |

EXAMPLE 3

Polymerisations in Button Moulds

In this and the following example the effects of changing the type of cross-linker, the level of initiator and the level of solvent on optical and mechanical properties are investigated.

Monomers at the mole proportions shown in Table 5 were polymerised by the general method. All polymerisation contained 15 mole % HEMA-PC and the remaining amount after taking the cross-linker quantities into consideration was BA. The EF, hydrated optical clarity, EWC and hardness of the variant buttons are shown in Table 5.

TABLE 4

| Example No. | EGDMA Level/mol % | BADMA Level/mol % | AIBN Level/ mole % | Comments |
|---|---|---|---|---|
| 3.1 | 0 | 2 | 0.25 | — |
| 3.2 | 2 | 0 | 0.25 | — |
| 3.3 | 2 | 0 | 0.05 | — |
| 3.4 | 2 | 0 | 1.0 | — |
| 3.5 | 1.5 | 0.5 | 0.25 | — |
| 3.6 | 1 | 1 | 0.05 | — |
| 3.7 | 1 | 1 | 0.05 | Repeat of 3.6 |
| 3.8 | 1 | 1 | 0.25 | 15 wt % ethanol |
| 3.9 | 1 | 1 | 0.25 | — |

TABLE 5

| Example | Appearance | Other | Expansion Factor | Hydrated Optical Clarity | EWC | Hardness |
|---|---|---|---|---|---|---|
| 3.1 | Buttons turned white due to phase separation | — | x | x | x | x |
| 3.2 | Clear buttons, did not shatter on annealing | — | 1.16 ± 0.03 | clear | 34.8 ± 0.1 | 72 ± 0.5 |
| 3.3 | Clear buttons, crazed effect on top surface | — | 1.16 ± 0.03 | clear | 35.0 ± 0.0 | 66 ± 1.1 |
| 3.4 | Buttons turned white due to phase separation | — | x | x | x | x |
| 3.5 | Clear buttons | — | 1.15 ± 0.03 | clear | 32.3 ± 0.0 | 71 ± 0.8 |
| 3.6 | Clear buttons, crazed effect on | — | 1.13 ± 0.01 | clear | 30.6 ± 0.2 | 78 ± .08 |

TABLE 5-continued

| Example | Appearance | Other | Expansion Factor | Hydrated Optical Clarity | EWC | Hardness |
|---|---|---|---|---|---|---|
| 3.7 | top surface Clear buttons, crazed effect on top surface | Repeat of 3.6 | 1.14 ± 0.03 | clear | 30.5 ± 0.0 | 68 ± 1.6 |
| 3.8 | Clear buttons. Turn slightly opaque on hydrating | 15 wt % ethanol | 1.12 ± 0.04 | Slightly opaque | 29.7 ± 0.0 | 78 ± 0.6 |
| 3.9.1 | Clear buttons | — | 1.11 ± 0.02 | clear | 29.7 ± 0.1 | 66 ± 0.6 |
| 3.9.2 | — | — | 1.13 ± 0.03 | clear | 30.7 ± 0.0 | 78 ± 0.5 |
| 3.9.3 | — | — | 1.13 ± 0.01 | clear | 31.5 ± 0.1 | 74 ± 0.5 |
| 3.9.4 | — | — | 1.13 ± 0.02 | clear | 31.6 ± 0.1 | 82 ± 0.5 | x - not tested

EXAMPLE 4

Slices of some of the buttons made in Example 3 were subjected to mechanical tests to give the results shown in Table 6.

TABLE 6

| | Variant | | | Mechanical Properties | | |
|---|---|---|---|---|---|---|
| Sample | EGDMA level mole % | BADMA level mole % | AIBN level mole % | Modulus MPa | Stress MPa | Strain % |
| 3.9.3 | 1 | 1 | 0.25 | 1.73 ± 0.89 | 0.89 ± 0.06 | 80.40 ± 17.25 |
| 3.5 | 1.5 | 0.5 | 0.25 | 0.97 ± 0.04 | 0.61 ± 0.06 | 69.75 ± 5.57 |
| 3.2 | 2 | 0 | 0.25 | 0.70 ± 0.13 | 0.60 ± 0.05 | 102.98 ± 3.58 |
| 3.3 | 2 | 0 | 0.05 | 0.53 ± 0.26 | 0.51 ± 0.04 | 91.72 ± 14.09 |
| 3.6 | 1 | 1 | 0.05 | 1.16 ± 0.11 | 0.79 ± 0.01 | 77.59 ± 17.56 |

Discussion of Example 3 and 4

Crosslinker

The standard formulation HEMA-PC:BA:EGDMA:BADMA 15:83:1:1 was altered to use only one crosslinker, 2 mol % EGDMA or 2 mol % BADMA The production of 2% BADMA was unsuccessful resulting in white soft buttons due to phase separation. The complete removal of EGDMA from the polymer is unfavourable, as it seems to result in a loss of clarity.

Decreasing the level of BADMA from 2 to 0 mol %, and increasing the EGDMA level to maintain 2 mol % crosslinker level overall, results in buttons which have a higher expansion factor, higher water content and therefore reduced mechanical properties. This trend is shown clearly in Table 5 and 6. Increasing the EGDMA level at the expense of BADMA increases the water content due to the hydrophobic nature of BADMA.

Reducing Solvent Level

In the general method 20 wt % solvent was incorporated into the formulation to make the monomers miscible with each other. Example 3.8 was carried out to examine the effect of reducing the ethanol level to just above the lowest miscible level 15 wt %. This would reduce the time required to remove the solvent from the buttons before lathing. From Table 5 it was shown that the hydrated buttons are slightly opaque.

EXAMPLE 5

Lenses were cut from some of the buttons produced in example 3.6 by lathe to a parallel mono-curve design, 0.25 mm thick. The lenses, prior to hydration, had a gem-like quality, equivalent to polymethylmethacrylate. The lenses were hydrated and subjected to mechanical testing. The hydrated lenses were tested to have a modulus of 1.508±0.125 MPa, stress of 2.282±0.442 MPa and strain 102.93±15.30%.

The mechanical properties of the lenses are better than button slices of the same formulation. These differences may arise from the different dimension sizes of test samples (lens 0.25 mm thick compared to slices 1.50 mm thick).

EXAMPLE 6

Further membrane polymerisations were conducted using the monomer mixtures shown in table 7. For all examples, the initiator level was 0.25 mole % AIBN, whilst 1 mole % mole of EGDMA and BADMA were included as crosslinkers. The aromatic group containing comonomer used was BA in each case and that comonomer made up the remaining monomer in the polymerisation mixture. 20 weight % ethanol (based on the total polymerisation mixture) was used as solvent. The level of HEMA-PC was as specified in the table.

Discs cut from the membrane were subjected to biological evaluations. The results of the fibrinogen adsorption, fibroblast adhesion assay, bacterial adhesion assay, macrophage adhesion assay, granulocyte activation assay and bovine corneal endothelial touch test are shown in table 7. The results show that high R1 materials (see examples 1 and 2) which are biocompatible. In combination with example 2, these results show that biocompatible materials can be formulated with a range of mechanical properties appropriate for different applications and lens designs.

EXAMPLE 7

In vivo experiments were conducted in which lenses of the composition of example 3.9 lathe cut from buttons were implanted into rabbits using conventional equipment for insertion of IOL's in a rolled conformation. The results were successful.

The lenses were each circular and had a refractive power of about −12D in the eye. One type of lens had a diameter of 9 mm and centre thickness of 0.6 mm, whilst the other had a diameter of 7 mm and a centre thickness of 0.2 mm.

EXAMPLE 8

The formulation of example 3.6 was prepared but with 1% (by weight) of Daracure 1173 (CIBA GEIGY) as photoinitiator instead of AIBN, and 30% by weight of ethanol. Aliquots of the formulation were placed in circular lens molds machined from polymethylpentene (TPX Goodfellows). The molds were sealed and subjected to ultraviolet irradiation for 1 hour (mid range UV). The cured lenses were removed and extracted with ethanol and then water. The resulting lenses were clear and had a refractive index of 1.48. In the BCE assay (using the lighter weight)

their performance was almost equivalent to that of the machined lenses (average score 8 versus control 10 and lathed 9.5).

TABLE 7

| Example | mole % HEMA-PC | Fib'n Ads'n Rel.Abs. | Fibroblast Ad'n RLU | Bact. Ad'n RLU | Epi Ad'n RLU | M'phage Ad'n RLU | G'cyte Act'n Av no. | BCE Av Damage (2 g) | HAMA IP | Cell Damage |
|---|---|---|---|---|---|---|---|---|---|---|
| 6.1 (2.1) | 15 | 0.0 | 7 | 0.4 | 3 | 0.1 | 0.7 | 8 | 0.02 | 2 |
| 6.2 (2.2) | 12.5 | 0.2 | 15 | 2.1 | 4 | 1.6 | 2.9 | NT | 0.02 | 3 |
| 6.3 (2.3) | 10 | 0.0 | 17 | 3.5 | 5 | 2.3 | 1.8 | NT | NT | 2 |
| 6.4 (2.4) | 7.5 | 0.5 | 8 | 5.3 | 6 | 0.2 | 4.7 | NT | NT | 4 |
| 6.S lathed | 15 | | | | | | | 9.5 | NT | NT |
| PMMA Control | — | 2.0 | 34 | 11.7 | 47 | 10.6 | 7.5 | 3 | 1.5 | 9 |
| PHEMA Control | — | 0.2 | 40 | 3.5 | 19 | 0.5 | 6.8 | 6 | 0.53 | 4 |

What is claimed is:

1. A crosslinked polymer obtainable by radical polymerisation of ethylenically unsaturated monomers including
   a) a zwitterionic monomer of the general formula I

YBX        I wherein
   B is a straight or branched alkylene, oxaalkylene or oligo-oxaalkylene chain optionally containing one or more fluorine atoms or, if X or Y contains a terminal carbon atom bonded to B, a valence bond;
   X is a zwitterionic group; and
   Y is an ethylenically unsaturated polymerisable group selected from the group consisting of

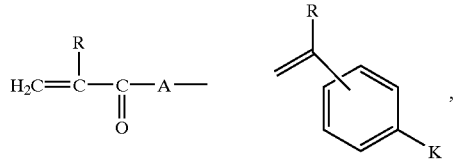

$CH_2=C(R)—CH_2—O—$, $CH_2=C(R)—CH_2OC(O)—$, $CH_2=C(R)OC(O)—$, $CH_2=C(R)—O—$, $CH_2=C(R)CH_2OC(O)N(R^1)—$, $R^2OOCCR=CRC(O)—O—$, $RCH=CHC(O)O—$, $RCH=C(COOR^2)CH_2—C(O)—O—$,

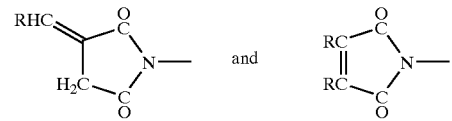

wherein:
   R is hydrogen or a $C_1$–$C_4$ alkyl group;
   $R^1$ is hydrogen or a $C_1$–$C_4$ alkyl group or $R^1$ is —B—X where B and X are as defined above; and
   $R^2$ is hydrogen or a $C_{1-4}$ alkyl group or BX where B and X are as defined above;
   A is —O— or —$NR^1$—;
   K is selected from the group consisting of —$(CH_2)_pOC(O)—$, —$(CH_2)_pC(O)O—$, —$(CH_2)_pOC(O)O—$, —$(CH_2)_pNR^3—$, —$(CH_2)_pNR^3C(O)—$, —$(CH_2)_pC(O)NR^3—$, —$(CH_2)_pNR^3C(O)O—$, —$(CH_2)_pOC(O)NR^3—$, —$(CH_2)_pNR^3C(O)NR^3—$ (in which the groups $R^3$ are the same or different), —$(CH_2)_pO—$, —$(CH_2)_pSO_3—$, and optionally in combination with B, a valence bond and p is from 1 to 12 and $R^3$ is hydrogen or a $C_1$–$C_4$ alkyl group;

b) an aromatic group containing monomer of the general formula II $Y^1R^4$        II wherein $Y^1$ is selected from the group consisting of

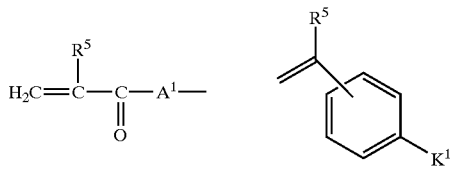

$CH_2=C(R^5)—CH_2—O—$, $CH_2=C(R^5)—CH_2OC(O)—$, $CH_2=C(R^5)OC(O)—$, $CH_2=C(R^5)—O—$, $CH_2=C(R^5)CH_2OC(O)N(R^6)—$, $R^7OOCCR^5=CR^5C(O)—O—$, $R^5CH=CHC(O)O—$, $R^5CH=C(COOR^7)CH_2—C(O)—O—$,

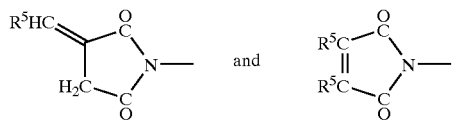

wherein:
   $R^5$ is hydrogen or a $C_1$–$C_4$ alkyl group;
   $R^6$ is hydrogen or a $C_1$–$C_4$ alkyl group or $R^6$ is $R^4$;
   $R^7$ is hydrogen or a $C_{1-4}$ alkyl group or $R^4$;
   $A^1$ is —O— or —$NR^6$—;
   $K^1$ is selected from the group consisting of —$(CH_2)_qOC(O)—$, —$(CH_2)_qC(O)O—$, —$(CH_2)_qOC(O)O—$, —$(CH_2)_qNR^8—$, —$(CH_2)_qNR^8C(O)—$, —$(CH_2)_qC(O)NR^8—$, —$(CH_2)_qNR^8C(O)O—$, —$(CH_2)_qOC(O)NR^8—$, —$(CH_2)_qNR^8C(O)NR^8—$ (in which the groups $R^8$ are the same or different), —$(CH_2)_qO—$, —$(CH_2)_qSO_3—$, and a valence bond q is from 1 to 12 and $R^8$ is hydrogen or a $C_1$–$C_4$ alkyl group;
   and $R^4$ is an aromatic group; and c) a cross-linking monomer of the general formula III $(Y^2)_nR^9$        III in which n is an integer of at least 2, each $Y^2$ is selected from the group consisting of

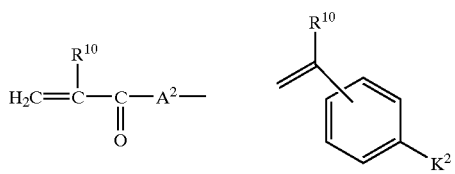

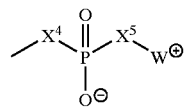

CH$_2$=C(R$^{10}$)—CH$_2$—O—, CH$_2$=C(R$^{10}$)—CH$_2$OC(O)—, CH$_2$=C(R$^{10}$)OC(O)—, CH$_2$=C(R$^{10}$)—O—, CH$_2$=C(R$^{10}$)CH$_2$OC(O)N(R$^{11}$)—, R$^{12}$OOCCR$^{10}$=CR$^{10}$C(O)—O—, R$^{10}$CH=CHC(O)O—, R$^{10}$CH=C(COOR$^{12}$)CH$_2$—C(O)—O—,

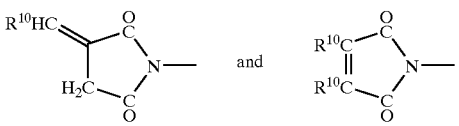

wherein:
R$^{10}$ is hydrogen or a C$_1$–C$_4$ alkyl group;
R$^{11}$ is hydrogen or a C$_1$–C$_4$ alkyl group;
R$^{12}$ is hydrogen or a C$_1$–C$_4$ alkyl group;
A$^2$ is —O— or —NR$^{11}$—;
K$^2$ is selected from the group consisting of —(CH$_2$)$_r$OC(O)—, —(CH$_2$)$_r$C(O)O—, (CH$_2$)$_r$OC(O)O—, —(CH$_2$)$_r$NR$^{12}$—, (CH$_2$)$_r$NR$^{12}$C(O)—, —(CH$_2$)$_r$C(O)NR$^{12}$—, —(CH$_2$)$_r$NR$^{12}$C(O)—, —(CH$_2$)$_r$OC(O)NR$^{12}$—, —(CH$_2$)$_r$NR$^{12}$C(O)NR$^{12}$— (in which the groups R$^{12}$ are the same or different), —(CH$_2$)$_r$O—, —(CH$_2$)$_r$SO$_3$— and a valence bond and r is from 1 to 12 and R$^{12}$ is hydrogen or a C$_1$–C$_4$ alkyl group;
and R$^9$ is an n-functional organic group;
wherein the cross-linked polymer is swellable in water such that the water content of the polymer when fully swollen in deionized water is in the range of 10 to 50% by weight, and the zwitterionic monomer of general formula I is present in an amount of at least 5 mole %, the aromatic group containing monomer of general formula II is present in an amount of at least 10 mole %, and the cross-linking monomer of general formula III is present in an amount of 0.01 to 10 mole %, based upon total monomer.

2. A polymer according to claim 1 in which R$^4$ is benzyl or phenyl.

3. A polymer according to claim 1 in which Y and Y$^2$ are the same, and are CH$_2$=CR$^x$COA, in which R$^x$ is methyl or hydrogen and A is 0.

4. A polymer according to claim 1 in which the cross-linking monomer comprises a compound of the general formula III in which R$^9$ is an aromatic group.

5. A polymer according to claim 1 in which the crosslinking monomer comprises a compound of the formula III in which R$^9$ is an aliphatic group.

6. A polymer according to claim 1 in which the monomers include a mixture of at least two cross-linking monomers of the general formula III, in at least one of which R$^9$ is an aromatic group and in at least one of which R$^9$ is an aliphatic group.

7. A polymer according to claim 6 in which the molar ratio of crosslinking monomer in which R$^9$ is aromatic to crosslinking monomer in which R$^9$ is aliphatic is in the range 10:1 to 1:10.

8. A polymer according to claim 1 in which the zwitterionic monomer is present in molar amount in the range 1 to 95% based on total ethylenically unsaturated monomer.

9. A polymer according to claim 1 in which the aromatic group containing monomer is present in a molar amount in the range 10 to 99% based on total ethylenically unsaturated monomer.

10. A polymer according to claim 1 in which the crosslinking monomer is present in a molar amount in the range 0.01 to 10% based on total ethylenically unsaturated monomer.

11. A polymer according to claim 1 in which the zwitterionic group has the general formula IV

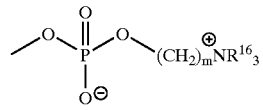

in which the moieties X$^4$ and X$^5$, which are the same or different, are —O—, —S—, —NH— or a valence bond and W$^+$ is a group comprising an ammonium, phosphonium or sulphonium cationic group and a group linking the anionic and cationic moieties which is a C$_{1-12}$-alkylene group.

12. A polymer according to claim 11 in which X is a group of formula V:

V $\overset{O}{\underset{O^{\ominus}}{\overset{\|}{P}}}$ with substituents —O—, —O—(CH$_2$)$_m$NR$^{16}$$_3$$^{\oplus}$ where the groups R$^{16}$ are the same or different and each is hydrogen or C$_{1-4}$ alkyl, and
m is from 1 to 4.

13. A gel comprising a polymer according to claim 1 swollen by a liquid.

14. A gel according to claim 13 in which the liquid is aqueous.

15. A refractive device formed of a polymer according to claim 1.

16. A device according to claim 15 which has an average transmission for visible light in the range 400 to 700 nm wavelength of at least 90% when swollen by water.

17. A device according to claim 15 which comprises an absorber of electromagnetic radiation.

18. A device according to claim 15, having a refractive index when fully swollen in water on the range 1.45–1.60.

19. A polymerisation process for preparing a cross linked polymer, in which a polymerisation mixture containing ethylenically unsaturated monomers is subjected to radical polymerisation, whereby addition polymerisation of the ethylenically unsaturated groups takes place, and in which the monomers include a) a zwitterionic monomer of the general formula I

YBX    I wherein
B is a straight or branched alkylene, oxaalkylene or oligo-oxaalkylene chain optionally containing one or more fluorine atoms or, if X or Y contains a terminal carbon atom bonded to B, a valence bond;

X is a zwitterionic group; and
Y is an ethylenically unsaturated polymerisable group selected from the group consisting of

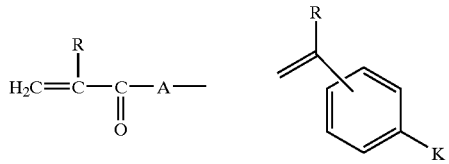

CH$_2$=C(R)—CH$_2$—O—, CH$_2$=C(R)—CH$_2$OC(O), CH$_2$=C(R)OC(O), CH$_2$=C(R)—O—, CH$_2$=C(R)CH$_2$OC(O)N(R$^1$)—, R$^2$OOCCR=CRC(O)—O—, RCH=CHC(O)O, RCH—C(COOR$^2$)CH$_2$—C(O)—O—,

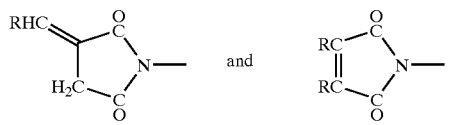

wherein
R is hydrogen or a C$_1$–C$_4$ alkyl group;
R$^1$ is hydrogen or a C$_1$–C$_4$ alkyl group or R$^1$ is —B—X where B and X are as defined above; and
R$^2$ is hydrogen or a C$_{1-4}$ alkyl group or BX where B and X are as defined above;
A is —O— or —NR$^1$—;
K is selected from the group consisting of —(CH$_2$)$_p$OC(O)—, —(CH$_2$)$_p$C(O)O—, —(CH$_2$)$_p$OC(O)O—, —(CH$_2$)$_p$NR$^3$—, —(CH$_2$)$_p$NR$^3$C(O)—, —(CH$_2$)$_p$C(O)NR$^3$—, —(CH$_2$)$_p$NR$^3$C(O)O—, —(CH$_2$)$_p$OC(O)NR$^3$—, —(CH$_2$)$_p$NR$^3$C(O)NR$^3$— (in which the groups R$^3$ are the same or different), —(CH$_2$)$_p$O—, —(CH$_2$)$_p$SO$_3$—, and optionally in combination with B, a valence bond and p is from 1 to 12 and R$^3$ is hydrogen or a C$_1$–C$_4$ alkyl group;
b) an aromatic group containing monomer of the general formula II

Y$^1$R$^4$     II wherein Y$^1$ is selected from the group consisting of

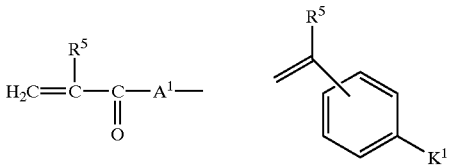

CH$_2$=C(R$^5$)—CH$_2$—O—, CH$_2$=C(R$^5$)—CH$_2$OC(O)—, CH$_2$=C(R$^5$)OC(O)—, CH$_2$=C(R$^4$)—O—, CH$_2$=C(R$^5$)CH$_2$OC(O)N(R$^6$)—, R$^7$OOCR$^5$=CR$^5$C(O)—O—, R$^5$CH=CHC(O)O—, R$^5$CH=C(COOR$^7$)CH$_2$—C(O)—O—,

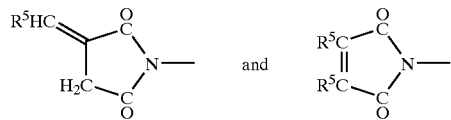

wherein:
R$^5$ is hydrogen or a C$_1$–C$_4$ alkyl group;
R$^6$ is hydrogen or a C$_1$–C$_4$ alkyl group or R$^6$ is R$^4$;
R$^7$ is hydrogen or a C$_{1-4}$ alkyl group or R$^4$;
A$^1$ is —O— or —NR$^6$;
K$^1$ is selected from the group consisting of —(CH$_2$)$_q$OC(O)—, —(CH$_2$)$_q$C(O)O—, —(CH$_2$)$_q$OC(O)O—, —(CH$_2$)$_q$NR$^8$—, —(CH$_2$)$_q$NR$^8$C(O)—, —(CH$_2$)$_q$C(O)NR$^8$—, —(CH$_2$)$_q$NR$^8$C(O)O—, —(CH$_2$)$_q$OC(O)NR$^8$—, —(CH$_2$)$_q$NR$^8$C(O)NR$^8$— (in which the groups R$^8$ are the same or different), —(CH$_2$)$_q$O—, —(CH$_2$)$_q$SO$_3$—, and a valence bond and q is from 1 to 12 and R$^8$ is hydrogen or a C$_1$–C$_4$ alkyl group;
and R$^4$ is an aromatic group; and
c) a cross-linking monomer of the general formula II (Y$^2$)$_n$R$^9$     III in which n is an integer of at least 2, each Y$^2$ is selected from the group consisting of

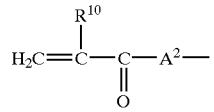

CH$_2$=C(R$^{10}$)—CH$_2$—O—, CH$_2$=C(R$^{10}$)—CH$_2$OC(O)—, CH$_2$=C(R$^{10}$)OC(O)—, CH$_2$=C(R$^{10}$)O—, CH$_2$=C(R$^{10}$)CH$_2$OC(O)N(R$^{11}$)—, R$^{12}$OOCCR$^{10}$=CR$^{10}$C(O)—O—, R$^{10}$CH=CHC(O)O—, R$^{10}$CH=C(COOR$^{12}$)CH$_2$—C(O)—O—,

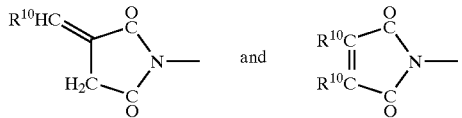

wherein:
R$^{10}$ is hydrogen or a C$_1$–C$_4$ alkyl group;
R$^{11}$ is hydrogen or a C$_1$–C$_4$ alkyl group;
R$^{12}$ is hydrogen or a C$_{1-4}$ alkyl group;
A$^2$ is —O— or —NR$^{11}$—;
K$^2$ is selected from the group consisting of —(CH$^2$)$_r$OC(O)—, —(CH$^2$)$_r$C(O)O—, —(CH$_2$)$_r$OC(O)O—, —(CH$_2$)$_r$NR$^{12}$, —(CH$_2$)$_r$NR$^{12}$C(O)—, —(CH$_2$)$_r$C(O)NR$^{12}$—, —(CH$_2$)$_r$NR$^{12}$C(O)O—, —(CH$_2$)$_r$OC(O)NR$^{12}$—, —(CH$_2$)$_r$NR$^{12}$C(O)NR$^{12}$— (in which the groups R$^{12}$ are the same or different), —(CH$_2$)$_r$O—, —(CH$_2$)$_r$SO$_3$— and a valence bond and r is from 1 to 12 and R$^{12}$ is hydrogen or a C$_1$–C$_4$ alkyl group;
and R$^9$ is an n-functional organic group;
wherein the cross-linked polymer is swellable in water such that the water content of the polymer when fully swollen in deionized water is in the range of 10 to 50% by weight, and the zwitterionic monomer of general formula I is present in the crosslinked polymer in an amount of at least 5 mole %, the aromatic group containing monomer of general formula II is present in the crosslinked polymer in an amount of at least 10 mole %, and the cross-linking monomer of general formula III is present in the crosslinked polymer in an amount of 0.01 to 10 mole %, based upon total monomer.

20. A process according to claim 19 in which the zwitterionic monomer is present in molar amount in the range 1 to 95% based on total ethylenically unsaturated monomer.

21. A process according to claim 19 in which the aromatic group containing monomer is present in a molar amount in the range 10 to 99% based on total ethylenically unsaturated monomer.

22. A process according to claim 19 in which the crosslinking monomer is present in a molar amount in the range 0.01 to 10% based on total ethylenically unsaturated monomer.

23. A process according to claim 19 in which polymerisation is initiated by a thermal, a redox or a U.V. initiator.

24. A process according to claim 19 in which the zwitterionic monomer and aromatic group containing monomer are immiscible in the absence of a co-solvent, and in which the polymerisation mixture contains a co-solvent which is a non-polymerisable liquid whereby the polymerisation mixture is a homogeneous solution.

25. A process according to claim 24 in which the co-solvent is an alcohol.

26. A process according to claim 24 in which the co-solvent is present in the polymerisation mixture in an amount in the range 5 to 90% by weight.

27. A process of forming a refractive device in which a polymerisation process according to claim 24 is carried out, the co-solvent is removed from the product polymer to form a xerogel which is substantially free of co-solvent, and the xerogel is shaped by cutting to a predetermined three dimensional shape.

28. A process according to claim 27 in which the refractive device is an intraocular lens.

29. A process of forming a refractive device in which a polymerisation process according to claim 24 is carried out whilst the polymerisation mixture is in a mould and, after polymerisation, the solvent is removed from the polymer.

30. A process according to claim 27 in which after the said cutting step, the xerogel is swollen in aqueous liquid.

31. A polymer according to claim 4 in which $R^9$ is a bisphenol A group.

32. A polymer according to claim 5 in which $R^9$ is an ethylene or an oligo(ethyleneoxy)ethylene group.

33. A polymer according to claim 6 in which the aromatic group is a bisphenol A group and the aliphatic group is an ethylene or oligo(ethyleneoxy)ethylene group.

34. A polymer according to claim 1 in which the zwitterionic monomer is present in a molar amount in the range 10 to 25%. The aromatic group containing monomer is present in a molar amount in the range 75 to 90% and the crosslinking monomer is present in a molar amount in the range 0.5 to 3%, each based on total ethylenically unsaturated monomer.

35. A polymer according to claim 11 in which $X^4$ and $X^5$ are O and $W^+$ is a group of formula $-W^1N^+R^{14}_3$, $-W^1-P^+R^{15}_3$, $-W^1-S^+R^{15}_2$ or $-W^1-Het^+$ in which:

$W^1$ is alkylene of 2–6 carbon atoms optionally containing one or more ethylenically unsaturated double or triple bonds, disubstituted-aryl, alkylene aryl, aryl alkylene, or alkylene aryl alkylene, disubstituted cycloalkyl, alkylene cycloalkyl, cycloalkyl alkylene or alkylene cycloalkyl alkylene, which group $W^1$ optionally contains one or more fluorine substituents and/or one or more functional groups; and either the groups $R^{14}$ are the same or different and each is hydrogen, selected from the group consisting of alkyl of 1 to 4 carbon atoms and aryl, or two of the groups $R^{14}$ together with the nitrogen atom to which they are attached form a heterocyclic ring containing from 5 to 7 atoms or the three groups $R^{14}$ together with the nitrogen atom to which they are attached form a fused ring structure containing from 5 to 7 atoms in each ring, and optionally one or more of the groups $R^{14}$ is substituted by a hydrophilic functional group, and the groups $R^{15}$ are the same or different and each is $R^{14}$ or a group $OR^{14}$, where $R^{14}$ is as defined above; or Het is an aromatic nitrogen-, phosphorus- or sulphur-containing ring.

36. A polymer according to claim 12 in which m is 2 and each $R^{16}$ is methyl.

37. A process according to claim 29 in which the solvent is removed from the polymer after the polymer has been removed from the mould, and in which the polymer is subsequently swollen in an aqueous liquid.

38. A process according to claim 19 in which the monomers include a mixture of at least two cross-linking monomers of the general formula III, in at least one of which $R^9$ is an aromatic group and in at least one of which $R^9$ is an aliphatic group.

39. A process according to claim 38 in which the zwitterionic monomer is present in a molar amount in the range 10 to 25%, the aromatic group containing monomer is present in a molar amount in the range 75 to 90% and the cross-linking monomer is present in a molar amount in the range 0.5 to 3%, each based on total ethylenically unsaturated monomer.

40. A process according to claim 19 in which the zwitterionic group has the general formula IV

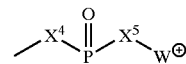

IV in which the moieties $X^4$ and $X^5$, which are the same or different, are $-O-$, $-S-$, $-NH-$ or a valence bond and $W^+$ is a group comprising an ammonium, phosphonium or sulphonium cationic group and a group linking the anionic and cationic moieties which is a $C_{1-12}$-alkylene group.

41. A process according to claim 40 in which X is a group of formula V:

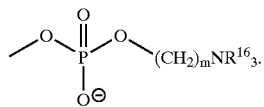

V

* * * * *